United States Patent Office 2,935,407
Patented May 3, 1960

2,935,407
PROCESS OF PRESERVING THE FRESH FLAVOR OF CITRUS FRUITS

James Paul Haman, Yonkers, N.Y., assignor to Wholorange Corporation, Orange, Conn., a corporation of Connecticut No Drawing. Application July 14, 1958
Serial No. 748,133

5 Claims. (Cl. 99—100)

The present invention relates to a process of preserving the fresh flavor of the whole citrus fruit and, more particularly, to a process of producing a citrus fruit preparation that contains all the important constituents present in the whole citrus fruit including all those present in the juice, in the pulp, and in the aromatic peel oil, and to a product obtained thereby in which the fresh flavor of the whole citrus fruit is preserved and oxidation of the citrus oil is retarded, even on refrigerated storage for a considerable period of time in an unsealed container.

Heretofore, citrus fruit juices and concentrates have been prepared by extracting the juice from the fresh citrus fruit in a manner in which the aromatic peel oil and the natural albedo pulp were either segregated from the juice or the amounts of peel oil and albedo pulp were greatly reduced in order to reduce the development of bitter flavor in the juice preparation.

It is one object of the present invention to provide a process of producing a creamed whole citrus fruit preparation wherein all the fresh flavor of the citrus fruit is retained in refrigerated storage for a normal use period.

Another object of the present invention is to provide a stable citrus fruit preparation which contains all the important components of the whole citrus fruit, i.e. the pulp, the juice, and the peel oil, and wherein the natural antioxidants and flavoring substances contained in both the fruit juice and the peel of the citrus fruit are preserved.

Other objects of the present invention and advantageous features therof will become apparent as the description proceeds.

In principle, the process according to the present invention consists in macerating the whole citrus fruit, when desired, removing the seeds if any, and then passing the macerated citrus fruit through a homogenizer so as to produce a cream-like liquid citrus fruit preparation, which contains all the important components present in the citrus fruit.

It is, of course, also possible to first express the juice from the citrus fruit or to extract it and to strain said juice to remove the seeds and then to recombine the strained juice and the reamed peels, after which the recombined juice and peels are macerated and finely homogenized so as to form a cream-like preparation.

It is also possible to mix the whole macerated citrus fruit with additional citrus fruit juice or juices.

When the added citrus juice is more acid than the whole macerated citrus fruit with which it is combined, for example, when lemon or lime juice is added to the whole macerated orange or whole macerated grape-fruit, the advantage is achieved that, due to the high acidity of sufficient added lemon or lime juice, the acidity of the creamed whole fruit preparation is sufficiently increased to inactivate the flavor destroying enzymes when the preparation is kept stored at normal refrigeration temperatures of about 40° C.

On proceeding according to the present invention, the citrus fruit and the components of its peel are brought intimately into contact with the natural organic reducing agents, such as ascorbic acid, citric acid, and the phenolic antioxidants contained not only in the fruit juice, but also and to a much greater extent in the albedo of the citrus fruit. These antioxidants prevent oxidation of the citrus oil and retard flavor deterioration associated with such oxidation. The acidity and the citrate radical present in the citrus fruit juices further help to preserve the freshness of the resulting creamed whole citrus fruit preparation.

In the more acid citrus fruits, such as creamed whole lemon and creamed whole lime, the combination of natural antioxidants, acidity or low pH-value, citric acid of citrates radical is fully sufficient to retard enzymatic action, flavor deterioration, and bacterial spoilage to such an extent, that the creamed whole lemon or lime preparation keeps for several weeks even in an unsealed container, while being used, provided it is stored in the home refrigerator or below 45° F.

In the less acid citrus fruits, such as creamed whole orange or tangerine preparations, the combination of antioxidants and acidity is sufficient to prevent flavor and color deterioration during flash pasteurization, whereby the pectase enzymes are inactivated and the bacterial count is reduced. Thus, when proceeding according to the present invention, the pasteurized whole orange or tangerine will have its freshness preserved and will also keep in the home refrigerator in an unsealed container for several weeks.

In the less acid fruits such as the orange, the creamed whole orange can be combined with other citrus juice or juices such as additional orange juice or lemon juice or with an edible fruit acid such as citric acid and with sugar or a high concentration sugar syrup to produce a concentrated fruit syrup with a solids concentration of about 65° Brix or higher. In this product the concentration of sugar solids, acidity, and refrigeration will inactivate the pectase enzymes and, together with the antioxidants in the creamed whole citrus fruit preparation, will preserve it in an unsealed container during the normal period of usage stored in the ordinary home refrigerator.

Heretofore, many attempts have been made to prevent the loss of fresh flavor in processed citrus fruit. All these attempts, especially for products not kept frozen up to the time of use, were based on the elimination of those parts of the fruit which contain compounds that potentially develop bitter flavor or are subject to oxidation and in avoiding or minimizing the flavor reactions between the aromatic peel oil and the other constituents, such as the acid present in the fruit.

Nobody ever heretofore was able to make available a product which contains all the nutritionally important parts of the citrus fruit and which is stable on storage and retains its original flavor and freshness.

The processes used heretofore frequently added separately prepared citrus fruit oil usually containing an added chemical antitoxidant to the juice, or they added a vegetable gum stabilizer or oil weighting agent (brominated vegetable oil) with a stabilizer thereto in order to prevent oil separation during storage.

In order to achieve the favorable results according to the present invention it is only necessary to homogenize the macerated whole citrus fruit in such a manner that the oil globules are broken down to a size of approximately $15\mu$ or smaller and that a uniform emulsion of said oil particles in the citrus fruit preparation is produced. Thereby the peel oil is emulsified by the natural emulsifiers present in the citrus pulp, such as the pectate substances therein. Adhesion of the oil globules to the pulp particles also has a favorable effect upon uniform distribution of all the citrus fruit components in the creamed preparation. Thus, no additional stabilizers and/or weighting agent need be added.

It is quite surprising that, by keeping the citrus fruit pulp in the preparation, it is possible to produce a product with excellent keeping qualities, which can be mixed in varied proportion with citrus or other fruit juices without separation of the various citrus fruit components, such as pulp or peel oil from the juice.

In principle, the process according to the present invention brings all of the sensitive aromatic and other chemically reactive constituents of citrus fruit, which normally result in flavor change, intimately into contact with the natural organic reducing compounds present in the fruit, namely with citric acid, ascorbic acid, and the phenolic antioxidants, which inhibit the chemical reactions which result in undesirable flavor changes. Thus, the process according to the present invention produces a whole citrus fruit preparation of a degree of freshness not obtainable heretofore, without any addition of chemical anti-oxidants, stabilizing or oil weighting substances and without any separation and removal of components of the citrus fruit.

The process according to the present invention is very economical and quite simple to be carried out in contrast to the heretofore known processes, since it merely requires maceration and fine homogenization. Additionally flash pasteurization may be used in the case of the less acid citrus fruits.

The following examples serve to illustrate the present invention without, however, limiting the same thereto.

*Example 1*

Fresh whole lemons are first subjected to a washing process by spraying the fruit with steam or water jets in order to clean them. The washed fruit are then passed through a macerating device, such as a comminutor or Osterizer.

The resulting macerated mass is then passed through a homogenizer, first at a pressure of about 500 pounds and then at a pressure of about 2000 pounds. The homogenized creamy lemon preparation, which contains all the components present in the lemon, is then ready for use.

*Example 2*

The procedure is the same as described in Example 1, with the only difference that first the juice is extracted from the washed fruit and is passed through a strainer to remove the seeds. The juice with the seeds removed is then recombined with the peel, macerated, and homogenized as described in Example 1.

*Example 3*

Whole lemons are prepared as described in Example 1 or as in Example 2 and are macerated with an equal part of previously prepared lemon juice in an Osterizer or comminutor. The resulting macerated mixture is then passed through a highly effective homogenizer first at a pressure of 500 pounds and twice at a pressure of 2200 pounds. The resulting creamy preparation is very stable on storage. No separation of pulpy material or of peel oil takes place even if the preparation is kept in an open container for about 12 weeks in an ordinary home refrigerator.

*Example 4*

Whole navel oranges are washed, and the buttons, if present, are removed. The fruit is mixed with about 50% of its weight of previously prepared single strength orange juice and the mixture is macerated in an Osterizer or comminutor. The resulting macerated mixture is passed through a homogenizer at 500 pounds' pressure and thereafter twice through an homogenizer at 3200 pounds. The resulting homogenized mixture is filled in bottles and sealed. No separation of the pulp nor of the peel oil is observed even on prolonged storage, and even if the container is kept open in a refrigerator for 12 weeks.

*Example 5*

Whole grapefruits are washed, cored to remove the seeds, cut in sections, and mixed with about ⅓ of their weight of grapefruit junice. The mixture is macerated in an Osterizer to form a macerated mass which is then passed through a homogenizer first at 500 pounds' pressure and then at 3000 pounds' pressure. The resulting homogenized preparation is bottled. It does not show any separation of peel oil and/or pulp, but remains stable even in an open container when kept in the refrigerator for 12 weeks.

In contrast to the above given examples, whole lemons, grapefruits, oranges, and other citrus fruit, when only macerated in an Osterizer without homogenization, begin to show oil separation from the pulpy material after standing for eight days.

It is possible to dilute, for instance, the preparation obtained according to Example 1, with various amounts of additional lemon juice. No separation occurs even after standing in an open container for several weeks under refrigeration while when admixing the same volume of lemon juice to a macerated lemon preparation, which had not been subjected to homogenization, slight separation occurred after about seven days.

According to a valuable embodiment of the present invention it has been found that a combination of the whole creamed orange obtained according to the present invention with one half volume or more of lemon juice and freezing the mixture for storage, will impart to such a mixture a stability such that the preparation will keep in a home refrigerator (temperature of about 40° F.) for 12 weeks, while being used. No flash pasteurization is necessary, although, as stated hereinabove, such pasteurization may be employed without destroying the valuable properties of the creamed preparation.

In the more acid citrus fruits, such as lemon, especially if the creamed lemon preparation is combined with an equal part of lemon juice, no pasturization will be needed. The additional advantage is achieved thereby, that acid hydrolysis of citral, a natural constituent of lemon oil, does not take place, and such citral, therefore, remains unchanged in the preparation. In contrast thereto, when subjecting the lemon preparation to pasturization, citral is very readily hydrolyzed at elevated temperature, and, thus, its flavor is completely changed.

Although citrus fruit preparations are known wherein the citrus fruit juice is combined with peel oil or even with parts of the peel, the prior art does not disclose a preparation comprising all the important components (everything but seeds of the whole citrus fruit, whereby these components are very finely divided by homogenization and are very intimately mixed with each other. Only when causing such a fine homogenization with intimate mixture of all the constituents present in the citrus fruit, is it possible to produce a whole citrus fruit cream which will have excellent storage property without any deterioration in flavor and taste. It is quite surprising that it is possible to use all the components of the whole citrus fruit, because it is well known that potentially bitter and unpalatable constituents are carried by the albedo and by the more fibrous and larger membranes within the fruit. Therefore, heretofore these albedo and fibrous membranes have been removed from citrus fruit preparations. It is entirely unexpected that when homogenizing and intimately mixing all the components of whole citrus fruit with each other to form a cream-like preparation, no such bitter taste is observed and that, on the contrary, the resulting creamy preparation retains its original flavor and taste even in refrigerated storage for a prolonged period of time.

As stated hereinabove, the creamy whole citrus fruit preparation and especially the creamy whole orange fruit preparation may have intimately admixed thereto sugar or a sugar syrup. The following example illustrates such a whole orange syrup and its preparation.

*Example 6*

The homogenized whole orange preparation obtained according to Example 4 is intimately mixed with a sufficient amount of sugar to produce a solids concentration in the orange syrup of 65° Brix.

In place of the orange juice added to the macerated oranges there may be added the same amount of a concentrated sugar syrup.

The resulting syrup is even more stable than the sugar-free creamy preparation.

Homogenization according to the present invention can be effected in any conventional type of homogenizer wherein the macerated mixture is passed under pressure between closely clearing, but relatively fixed surfaces. Usually such homogenizer rend the dispersed state into a very fine state of subdivision of the order of one micron in diameter. Suitable homogenizers are, for instance, the Cherry-Burrell Viscolizer and the Matton-Gaulin homogenizer, wherein the macerated mixture is actuated by a reciprocating pump comprising a series of multiple plungers which are operated by an eccentric driving shaft, and wherein the liquid is forced through the valve openings. The product develops a very high velocity during its passage through the extremely small opening. As a result of this velocity and of the frictional drag of the material in actual contact with the surfaces of the valve plug and seat, there develops a marked internal shearing within the product which tends to break down the particle size of the dispersed solid particles. Furthermore, an explosive effect also occurs as the particles are relieved from the zone of high pressure to that of atmospheric pressure. The viscolizer or other homogenizer of this type can be operated to give a pressure of the order of 4000 pounds to 5000 pounds. Other types of suitable homogenizers are the Marco-Flowmaster homogenizer, the Flowmaster Com-Bi-Nator, and the like. Colloid mills may also be used for this purpose. The best type of homogenizer for any given type of starting material can readily be determined by preliminary experiments.

I claim:
1. In a process of producing a creamy whole citrus fruit preparation, the steps which consist in macerating whole citrus fruit selected from the group consisting of whole seedless citrus fruit and whole citrus fruit freed of seeds and homogenizing the resulting macerated whole citrus fruit mass so as to reduce the particle size of the citrus oil globules to a size not substantially exceeding about 15 microns.

2. The process according to claim 1, wherein the macerated citrus fruit is mixed with citrus fruit juice and wherein the resulting mixture is then homogenized.

3. In a process of producing a stable creamy orange fruit preparation, the steps which consist in macerating whole oranges, homogenizing the macerated oranges so as to reduce the particle size of the citrus oil globules present in said oranges to a size not substantially exceeding about 15 microns, and flash pasturizing the resulting homogenized orange preparation.

4. In a process of producing a stable, creamy orange fruit preparation, the steps which consist in macerating whole oranges, adding lemon juice to the macerated oranges, and homogenizing the resulting mixture of lemon juice and macerated oranges so as to reduce the particle size of the citrus oil globules to a size not substantially exceeding about 15 microns.

5. In a process of producing a creamy whole citrus fruit preparation, the steps which consist in macerating whole citrus fruit, mixing the macerated citrus fruit with citrus fruit juice, and homogenizing the resulting mixture of citrus fruit juice and macerated citrus fruit so as to reduce the particle size of the citrus oil globules to a size not substantially exceeding about 15 microns.

References Cited in the file of this patent
UNITED STATES PATENTS

| | | |
|---|---|---|
| 1,717,489 | Barlow | June 17, 1929 |
| 2,086,911 | Hill | July 13, 1937 |
| 2,328,554 | Heyman | Sept. 7, 1943 |